(12) United States Patent
Aschoff et al.

(10) Patent No.: US 9,945,433 B2
(45) Date of Patent: Apr. 17, 2018

(54) ELECTROMAGNET, ELECTROMAGNETICALLY ACTUATABLE BRAKE AND BRAKE MOTOR

(71) Applicant: SEW-EURODRIVE GMBH & CO. KG, Bruchsal (DE)

(72) Inventors: Stefan Aschoff, Darmstadt (DE); Pascal Heinrich, Roeschwoog (FR)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 14/411,019

(22) PCT Filed: May 27, 2013

(86) PCT No.: PCT/EP2013/001557
§ 371 (c)(1),
(2) Date: Dec. 23, 2014

(87) PCT Pub. No.: WO2014/005664
PCT Pub. Date: Jan. 9, 2014

(65) Prior Publication Data
US 2015/0184704 A1    Jul. 2, 2015

(30) Foreign Application Priority Data

Jul. 6, 2012 (DE) .................. 10 2012 013 350

(51) Int. Cl.
*F16D 63/00* (2006.01)
*F16D 59/02* (2006.01)
(Continued)

(52) U.S. Cl.
CPC .......... *F16D 63/002* (2013.01); *F16D 59/02* (2013.01); *H01F 7/081* (2013.01); *H01F 7/1638* (2013.01);
(Continued)

(58) Field of Classification Search
CPC .. H01F 2003/106; F16D 63/002; F16D 59/02; F16D 2121/22
(Continued)

(56) References Cited

U.S. PATENT DOCUMENTS 2,273,073 A     2/1942   Stockwell et al.
3,759,097 A  *  9/1973   Cushing .............. 73/861.15
(Continued)

FOREIGN PATENT DOCUMENTS

CN    2798268 Y     7/2006
CN    201178011 Y   1/2009
(Continued)

OTHER PUBLICATIONS

International Search Report, dated Aug. 1, 2013, issued in corresponding International Application No. PCT/EP2013/001557.
(Continued)

*Primary Examiner* — Thomas J Williams
(74) *Attorney, Agent, or Firm* — Andrews Kurth Kenyon LLP

(57) ABSTRACT

An electromagnet, particularly a brake coil, especially for an electromagnetically actuatable brake, an electromagnetically actuatable brake and a brake motor, the electromagnet having a coil winding accommodated in a coil brace, the coil brace being accommodated in a magnet body, the magnet body being two-part or multipart, an internal pole being produced from a first material and the external pole being produced from a second material, the first material exhibiting a higher specific magnetic permeability than the second material.

19 Claims, 4 Drawing Sheets

(51) Int. Cl.
*H01F 7/08* (2006.01)
*H01F 7/16* (2006.01)
*H01F 7/20* (2006.01)
*H01F 3/10* (2006.01)
*F16D 121/22* (2012.01)

(52) U.S. Cl.
CPC ........... *H01F 7/20* (2013.01); *F16D 2121/22* (2013.01); *H01F 2003/106* (2013.01)

(58) Field of Classification Search
USPC .................. 188/161, 171, 173; 335/296, 297
See application file for complete search history.

(56) References Cited

U.S. PATENT DOCUMENTS

| | | | | |
|---|---|---|---|---|
| 4,982,825 | A | * | 1/1991 | Sekella ........................ 188/161 |
| 5,154,261 | A | * | 10/1992 | Tanaka et al. ................. 188/171 |
| 5,685,398 | A | * | 11/1997 | Marshall et al. ............. 188/171 |
| 5,873,436 | A | * | 2/1999 | Schneider ..................... 188/158 |
| 2010/0305402 | A1 | * | 12/2010 | Shachar et al. ............... 335/297 |
| 2011/0121935 | A1 | | 5/2011 | Chu et al. |

FOREIGN PATENT DOCUMENTS

| | | |
|---|---|---|
| CN | 102074333 A | 5/2011 |
| DE | 1 959 460 | 7/1970 |
| DE | 198 05 171 | 8/1999 |
| DE | 10 2006 062 3 | 7/2008 |
| DE | 20 2008 008 6 | 11/2009 |
| EP | 0 936 636 | 8/1999 |
| GB | 1 287 800 | 9/1972 |
| JP | 2011-165977 A | 8/2011 |
| WO | 2009/156213 | 12/2009 |

OTHER PUBLICATIONS

International Preliminary Report on Patentability, dated Jan. 22, 2015, issued in corresponding International Application No. PCT/EP2013/001557.

\* cited by examiner

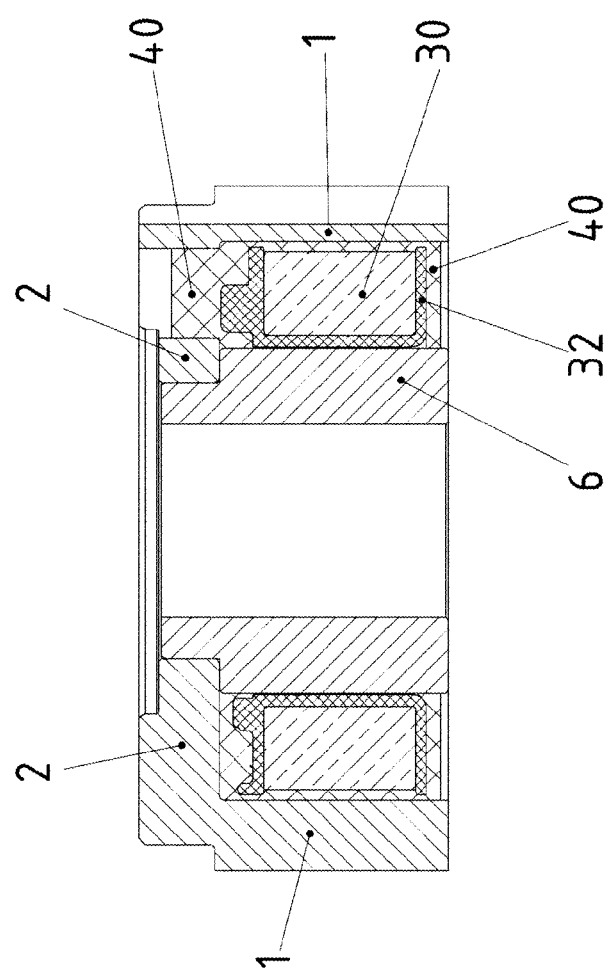

ELECTROMAGNET, ELECTROMAGNETICALLY ACTUATABLE BRAKE AND BRAKE MOTOR

FIELD OF THE INVENTION

The present invention relates to an electromagnet, an electromagnetically actuatable brake and a brake motor.

BACKGROUND INFORMATION

It is generally known that an electromagnet has a coil winding which is inserted into a magnet body.

SUMMARY

Therefore, an object of the present invention is to further develop a high-performance brake which is as compact as possible and to simplify manufacture.

In the present invention, the objective is achieved in the case of an electromagnet, in the case of an electromagnetically actuatable brake, and in the case of a brake motor.

Important features of the present invention with regard to the electromagnet are that the electromagnet, especially brake coil, particularly for an electromagnetically actuatable brake, has a coil winding accommodated in a coil brace, the coil brace being accommodated in a magnet body, the magnet body being two-part or multipart, an internal pole being produced from a first material and the external pole being produced from a second material, the first material exhibiting a higher specific magnetic permeability than the second material.

The advantage is that the internal pole transmits a high magnetic field strength without going into saturation. The external pole may be produced from a different, e.g., more cost-effective material than the internal pole. Therefore, a high field strength may be provided in the internal pole before saturation of the material is reached. It may be that the external pole is only able to be acted upon with a lower field strength before saturation is reached, because material of lower permeability is used than for the internal pole; however, the external pole may be produced from a more cost-effective material.

In one advantageous development, the coil winding is a ring winding. This is advantageous because it permits simple manufacture.

In one advantageous refinement, the first material is a steel or a ferrite and/or the second material is a ductile cast iron. This is advantageous because an inexpensive material is usable for the external pole, and a material of higher permeability is used for the internal pole. Consequently, a compact, high-performance brake is able to be produced, in particular, a large winding is able to be realized in the magnet body, and it is possible to use only a small mass for the magnet body. The mass proportion and/or volumetric component of the coil winding is therefore selectable to be as high as possible in comparison to the corresponding component of the magnet body.

In one advantageous embodiment, the internal pole is pressed into another part of the magnet body, especially the back of the magnet body, and/or is joined to this part with force locking This offers the advantage that simple manufacture is attainable.

In one advantageous refinement, the external pole of the magnet body is realized integrally, thus, in one piece, with the back of the magnet body. The advantage here is that a very great axial depth is able to be produced for the accommodation area of the brake coil.

In one advantageous development, the internal pole is thinned in the area of the connection to the other part of the magnet body, so that an undercut is formed, in which area the coil brace together with the coil winding is bounded, especially between the undercut and the back of the magnet body. The advantage in this case is that a simple connection is achievable between the coil brace and magnet body, especially internal pole.

In one advantageous refinement, the coil brace together with the coil winding is encapsulated in the magnet body with the aid of potting compound. This is advantageous because increased mechanical stability is attainable.

In one advantageous embodiment, a connecting part, at which one respective end of the coil-winding wire is electrically connected and a supply line, especially a litz line, is inserted into a pocket-shaped accommodation area formed on the coil brace, in particular, the internal pole having a flattened region in the angle-at-circumference area covered by the connecting part. The advantage in this instance is that a protected accommodation is provided for the connecting part, at which the coil-winding wires are connected to supply lines.

In one advantageous development, the internal pole is shaped essentially cylindrically. This offers the advantage that the ring coil is able to be accommodated in an easy manner.

In one advantageous refinement, the external pole takes the form of a body of rotation, in particular, a depression for the routing of electric lines being formed out or incorporated at the circumference of the external pole, and/or bore holes being formed or incorporated at the axial end face of the external pole facing a motor, particularly bore holes set apart uniformly from each other in the circumferential direction, especially for receiving guide elements for the guidance of an armature disk of a brake and/or spacing elements which set apart the external pole relative to the electric motor connectable to the external pole. This is advantageous because it permits easy manufacture.

In one advantageous refinement, the coil brace is an injection-molded plastic part. The advantage in this case is that easy manufacture is achievable, an electrically insulating plastic being usable in the process.

In one advantageous development, a cable-routing channel encircling in the circumferential direction is formed on the coil brace. The advantage in this instance is that cable routing is integrated on the coil brace.

In one advantageous refinement, the coil brace together with the coil winding is encapsulated in the magnet body with the aid of potting compound. This is advantageous because increased mechanical stability is attainable. In addition, the potting compound brings about improved heat dissipation.

Important features with regard to the electromagnetically actuatable brake are that it is implemented with such an electromagnet. Therefore, the brake is realizable in very compact fashion and exhibits high performance.

Important features with regard to the brake motor are that the brake motor includes an electric motor having such an electromagnetically actuatable brake. The advantage in this case is that a compact, high-performance brake is able to be integrated on the motor, so that the weight of the motor is very low.

BRIEF DESCRIPTION OF THE DRAWINGS

FIG. 4 shows an associated cross-section.

DETAILED DESCRIPTION

Figure 1:
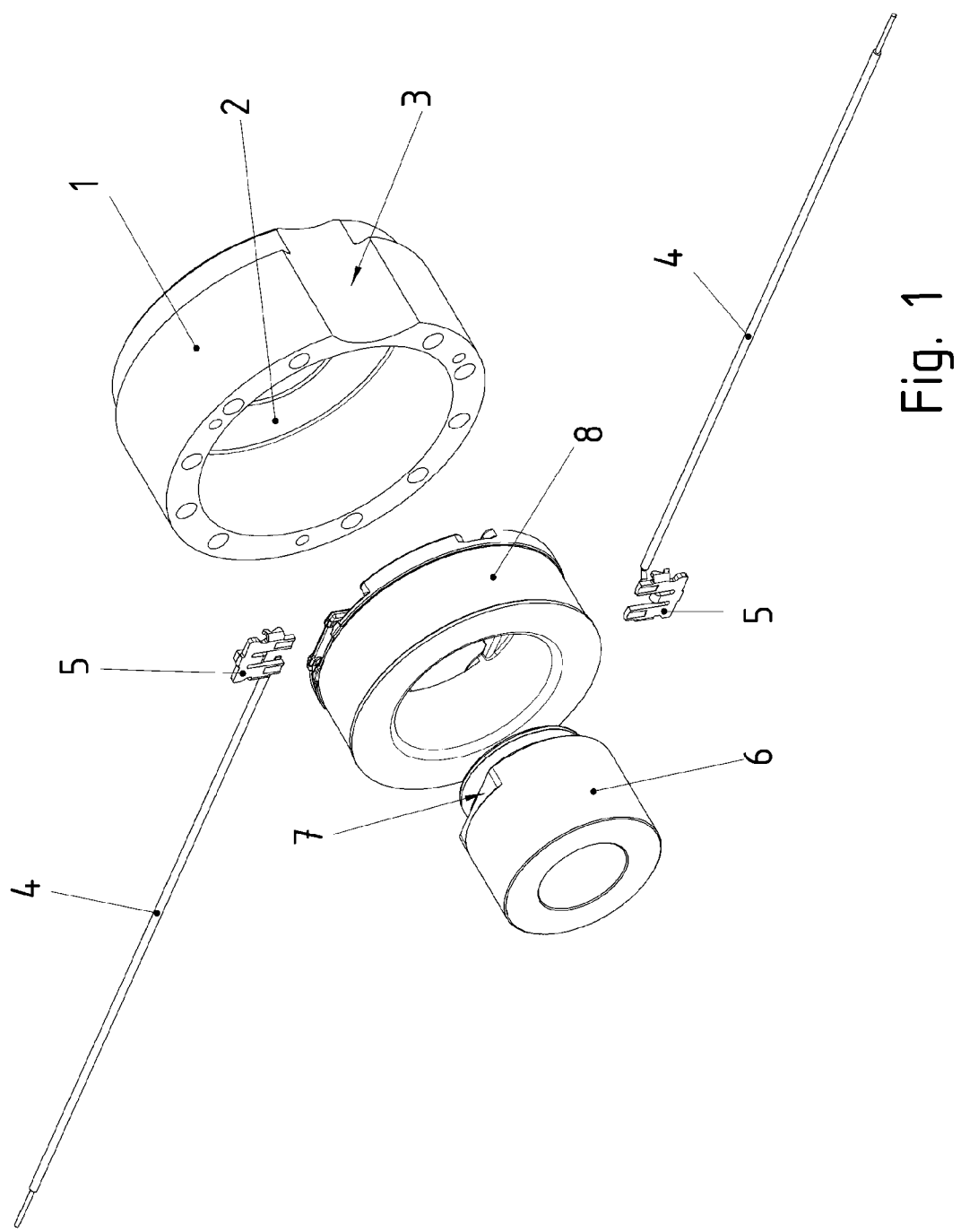
FIG. 1 shows an exploded view of a brake coil for an electromagnetically actuatable brake.
Figure 2:
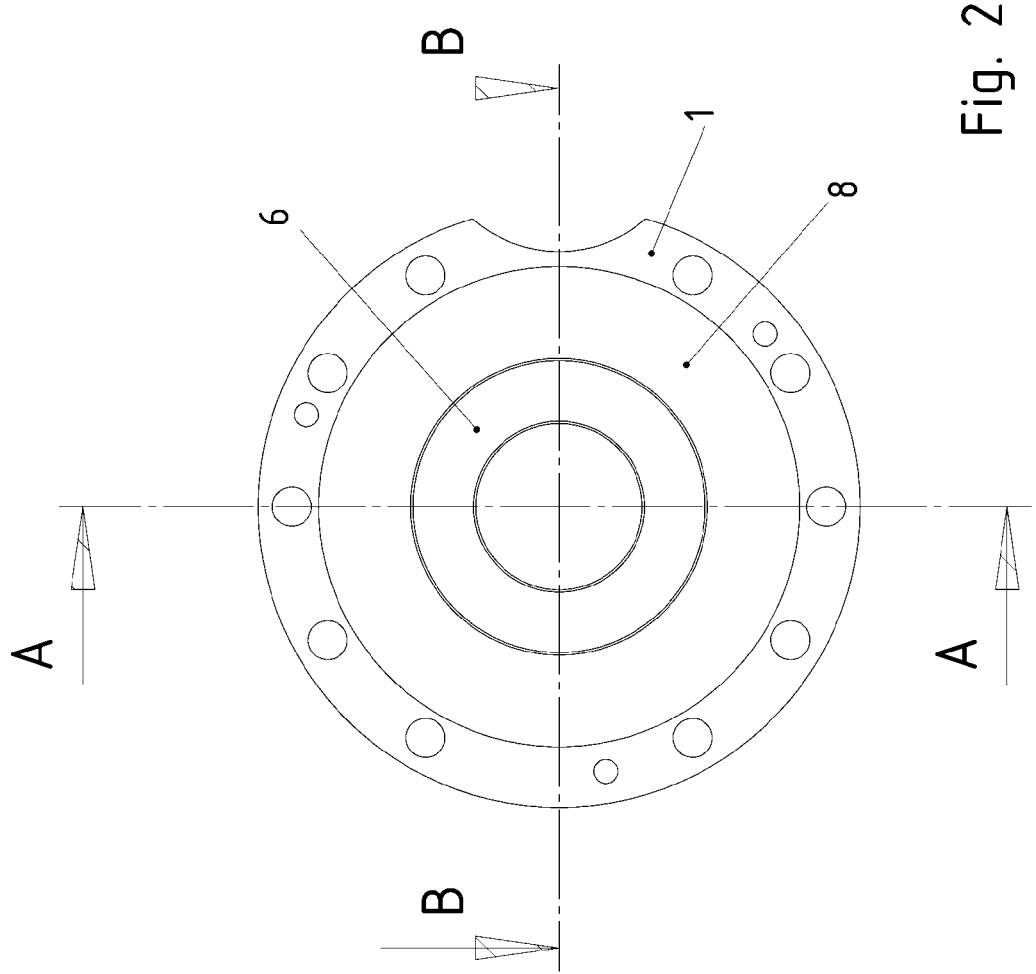
FIG. 2 shows a front view of the brake coil.
Figure 3:
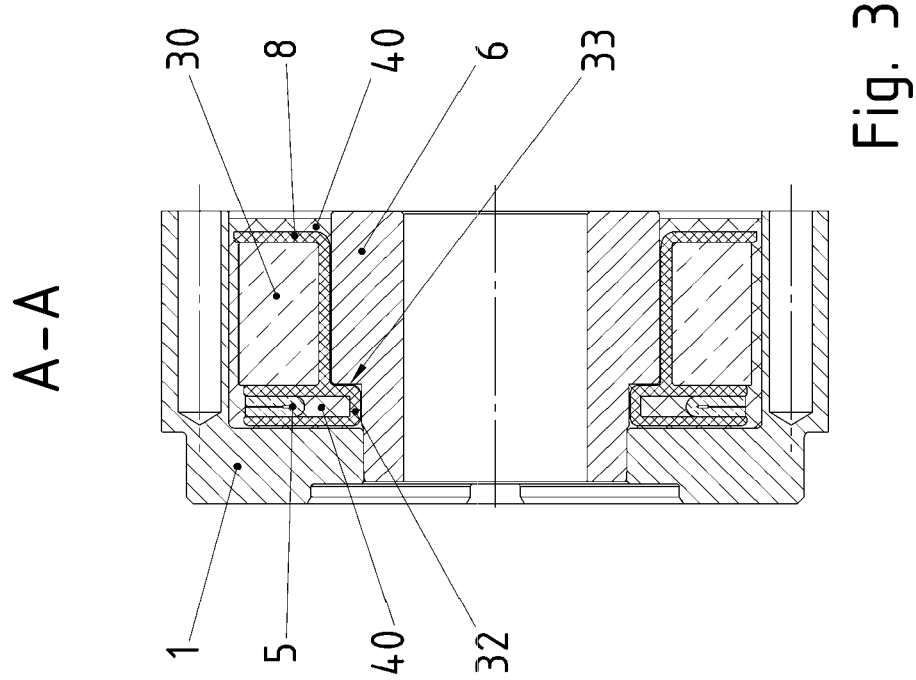
FIG. 3 shows an associated longitudinal section.

As shown in the figures, a magnet body of a brake coil of an electromagnetically actuatable brake has a ring-shaped external pole 1 of the magnet body and a back 2 of the magnet body, external pole 1 and back 2 being realized in one piece.

Preferably a ferromagnetic material, in particular a ferromagnetic steel, for example, or a cast steel, especially ductile cast iron, is used as material for the magnet body.

Back 2 has a centrally located, especially circular opening. Thus, back 2 is realized in the manner of an apertured disk.

Internal pole 6 is essentially cylindrical and is joined to the magnet body with force locking, especially by an interference fit. In manufacturing the brake, internal pole 6 is pressed into the opening in back 2.

Internal pole 6 is made of a material which exhibits a higher specific magnetic permeability than external pole 1 having back 2. For example, ferrite or another highly permeable material is usable as material for internal pole 6. In this way, a high field strength is transmittable in internal pole 6 without saturation occurring.

External pole 1 has an axially running depression 3 for the cable routing, especially for the routing of the stator lines of an electric motor connected to the brake. Therefore, the stator-winding lines of an electric motor, on which the brake is mounted or into which the brake is installed, are able to be led past the brake in space-saving fashion and then guided from there to a connection box in which supply lines for the supply of the motor are connectable. In addition, the supply lines of the brake coil are also able to be directed from the connection box to the brake as brake-coil-winding connecting lines 4. In this context, litz wire is usable as respective brake-coil-winding connecting line 4, for example. Coil winding 30 is implemented as a ring-coil winding and has a first and a further brake-coil-winding connecting line 4.

Brake-coil-winding connecting lines 4 are each joined, especially welded, to a connecting part 5. Respective connecting part 5 is preferably realized as a stamped bent part, especially made of sheet copper.

One respective end of the winding wire of brake-coil winding 30 is also electrically connected at respective connecting part 5. Brake-coil winding 30 is realized as a ring winding and is accommodated in a coil brace 8. Coil brace 8 is made of plastic, especially as an injection-molded part.

Coil brace 8 is retained on internal pole 6 with the aid of an undercut 33, internal pole 6 having a step for this purpose, thus, a radial thickening which is set apart axially from the connection region between internal pole 6 and the magnet body, particularly back 2.

Coil brace 8 has a corresponding radial thickness, which thus fits into the axial intermediate area between the thickening of internal pole 6 and the connection region between internal pole 6 and the magnet body, particularly back 2. Thus, an axial fixation on undercut 33 is achieved. Connecting part 5 is accommodated in an accommodation area 31 of coil brace 8, which is formed as a recess in the thickening of coil brace 8. Accommodation area 31 is realized as a pocket-shaped coil-form section to form the accommodation area for connecting part 5 and/or cable routing. Also formed on coil brace 8 is a circumferential groove which is used for the cable routing and opens through into the pocket-shaped coil-form sections.

Depression 3 permits a cable routing, especially for the routing of the stator lines, in the axial direction over the axial area covered by the magnet body.

Coil brace 8 is encapsulated in the accommodation area between external pole 1 and internal pole 6 with the aid of potting compound 40.

At the angle-at-circumference area at which connecting part 5 is inserted in the radial direction radially inward on coil brace 8, connecting part 5 projects radially further inward than the inside diameter of coil brace 8. In the corresponding angle-at-circumference area, internal pole 6 has a radial depression, so that connecting part 5 rests with its radial inner end area on internal pole 6.

Internal pole 6 is realized as a hollow cylindrical part, so that the brake rotor shaft is able to protrude axially through the magnet body, and an angular-position sensor is connectable on the side of the brake facing away from the motor.

Connecting part 5 may also be referred to as a contact hook.

The brake coil is supplied with DC current. Upon energizing, an armature disk of the brake—the armature disk being made of steel, being joined in rotatably fixed fashion to the magnet body and being disposed in a manner allowing axial movement - is moved axially toward the magnet body against the spring force generated by spring elements supported on the magnet body. When no current is supplied, the armature disk is pushed away from the magnet body.

Advantageously, internal pole 6 and external pole 1 are able to be produced from different materials. Internal pole 6 exhibits higher flux densities than external pole 1, when the material of internal pole 6 has a higher permissible maximum induction and/or steeper magnetization characteristic. Consequently, fewer core losses and/or magnetization losses occur.

Preferably, internal pole 6 is produced from a bar material on an automatic bar turning machine.

Since external pole 1 and back 2 of the magnet body have a pot-like form, easy manufacture is made possible by casting and/or forging.

With the aid of undercut 33, not only is coil brace 8 able to be fixed in position between internal pole 6 and back 2, but also the internal-pole surface is able to be dimensioned larger than without the formation of undercut 33. Thus, the shape of the characteristic between magnetic force and air gap is less steep, the air gap being the axial distance between the armature disk and the magnet body.

The application time of the brake may be defined by the depth to which internal pole 6 is pressed into back 2 of the magnet body, especially as a function of the braking torque and/or the spring elements.

LIST OF REFERENCE NUMERALS

1 External pole of the magnet body
2 Back of the magnet body
3 Depression for the cable routing, especially for the routing of the stator lines
4 Brake-coil-winding connecting line
5 Connecting part, especially a stamped bent part
6 Internal pole
7 Flattened region
8 Coil brace
30 Coil winding
31 Accommodation area for connecting part 5

32 Pocket-shaped coil-form section to form the accommodation area for connecting part 5 and/or cable routing
33 Undercut
40 Potting compound

What is claimed is:

1. An electromagnet, comprising:
    a coil winding accommodated in a coil brace; and
    a magnet body in which the coil brace is accommodated, the magnet body being two-part or multipart, the magnet body including an internal pole produced from a first material and an external pole produced from a second material, wherein the first material exhibits a higher specific magnetic permeability than the second material;
    wherein:
        the internal pole is at least one of:
            pressed into an other part of the magnet body, and
            joined to the other part with force locking;
        the other part of the magnet body is a back of the magnet body; and
        the internal pole is thinned in an area of connection to the other part of the magnet body, so that an undercut is formed, in which area the coil brace together with the coil winding is bounded.

2. The electromagnet as recited in claim 1, wherein the coil brace is situated in an area between the internal pole and the external pole.

3. The electromagnet as recited in claim 1, wherein the electromagnet is a brake coil for an electromagnetically actuatable brake.

4. The electromagnet as recited in claim 1, wherein the coil winding is a ring winding.

5. The electromagnet as recited in claim 1,
    wherein at least one of:
        the first material is one of steel and ferrite, and
        the second material is ductile cast iron.

6. The electromagnet as recited in claim 1, wherein the coil brace together with the coil winding is bounded between the undercut and the back of the magnet body.

7. The electromagnet as recited in claim 1, wherein the coil brace together with the coil winding is encapsulated in the magnet body with the aid of a potting compound.

8. The electromagnet as recited in claim 1, further comprising:
    a connecting part, at which one respective end of a coil-winding wire of the coil winding is electrically connected, wherein a supply line, is inserted into a pocket-shaped accommodation area formed on the coil brace.

9. The electromagnet as recited in claim 8, wherein the supply line is a litz line.

10. The electromagnet as recited in claim 1, wherein the internal pole is essentially cylindrical.

11. The electromagnet as recited in claim 1, wherein the coil brace is an injection-molded plastic part.

12. The electromagnet as recited in claim 1, wherein a cable-routing channel encircling in a circumferential direction is formed on the coil brace.

13. An electromagnet, comprising:
    a coil winding accommodated in a coil brace;
    a magnet body in which the coil brace is accommodated, the magnet body being two-part or multipart, the magnet body including an internal pole produced from a first material and an external pole produced from a second material, wherein the first material exhibits a higher specific magnetic permeability than the second material; and
    a connecting part, at which one respective end of a coil-winding wire of the coil winding is electrically connected, wherein a supply line, is inserted into a pocket-shaped accommodation area formed on the coil brace;
    wherein the internal pole has a flattened region in an angle-at-circumference area covered by the connecting part.

14. The electromagnet as recited in claim 13, wherein the internal pole is at least one of:
    pressed into an other part of the magnet body, and
    joined to the other part with force locking.

15. The electromagnet as recited in claim 14, wherein the other part of the magnet body is a back of the magnet body.

16. The electromagnet as recited in claim 15, wherein the external pole of the magnet body is realized integrally, in one piece, with the back of the magnet body.

17. An electromagnet, comprising:
    a coil winding accommodated in a coil brace; and
    a magnet body in which the coil brace is accommodated, the magnet body being two-part or multipart, the magnet body including an internal pole produced from a first material and an external pole produced from a second material, wherein the first material exhibits a higher specific magnetic permeability than the second material;
    wherein:
        the external pole takes a form of a body of rotation, at least one of:
            a depression for a routing of electric lines being formed out or incorporated at a circumference of the external pole,
            bore holes being formed or incorporated at an axial end face of the external pole facing a motor, the bore holes set apart uniformly from each other in a circumferential direction, for receiving at least one of guide elements for a guidance of an armature disk of a brake and spacing elements which set apart the external pole relative to the motor connectable to the external pole.

18. An electromagnetically actuatable brake, comprising:
    an electromagnet, comprising:
        a coil winding accommodated in a coil brace; and
        a magnet body in which the coil brace is accommodated, the magnet body being two-part or multipart, the magnet body including an internal pole produced from a first material and an external pole produced from a second material, wherein the first material exhibits a higher specific magnetic permeability than the second material, wherein the coil brace is situated in an area between the internal pole and the external pole;
    wherein:
        the internal pole is at least one of:
            pressed into an other part of the magnet body, and
            joined to the other part with force locking;
        the other part of the magnet body is a back of the magnet body; and
        the internal pole is thinned in an area of connection to the other part of the magnet body, so that an undercut is formed, in which area the coil brace together with the coil winding is bounded.

19. A brake motor, comprising:
    an electric motor having an electromagnetically actuatable brake that includes an electromagnet, comprising:
        a coil winding accommodated in a coil brace; and a magnet body in which the coil brace is accommodated, the magnet body being two-part or multipart, the magnet body including an internal pole produced from a first material and an external pole produced from a second material, wherein the first material exhibits a higher specific magnetic permeability than the second material, wherein the coil brace is situated in an area between the internal pole and the external pole;

wherein:
  the internal pole is at least one of:
    pressed into an other part of the magnet body, and joined to the other part with force locking;
  the other part of the magnet body is a back of the magnet body; and
  the internal pole is thinned in an area of connection to the other part of the magnet body, so that an undercut is formed, in which area the coil brace together with the coil winding is bounded.

\* \* \* \* \*